United States Patent [19]
Adams

[11] Patent Number: 5,947,808
[45] Date of Patent: Sep. 7, 1999

[54] SEAFOOD SKIN, MEMBRANE, BONE, CARTILAGE, ANTENNAE, LEG, SHELL, BEARD AND/OR VEIN REMOVAL APPARATUS AND METHODS FOR USE THEREOF

[75] Inventor: Thomas W. Adams, Hansville, Wash.

[73] Assignee: Clariant GmbH, Frankfurt, Germany

[21] Appl. No.: 09/078,840

[22] Filed: May 14, 1998

[51] Int. Cl.⁶ .......................... A22C 25/16; A22C 29/02
[52] U.S. Cl. .................. 452/6; 452/135; 452/137
[58] Field of Search ................ 452/6, 135, 137, 452/3, 157, 158

[56] References Cited

U.S. PATENT DOCUMENTS

| | | | |
|---|---|---|---|
| 954,084 | 4/1910 | Gelbman | 452/137 |
| 1,204,676 | 11/1916 | Machuga | 30/123 |
| 1,324,565 | 12/1919 | Przybylek | 30/148 |
| 1,456,844 | 5/1923 | De Bie | 30/155 |
| 2,030,463 | 2/1936 | Nelms | 452/137 |
| 2,622,729 | 12/1952 | Uttz | 30/123 |
| 2,793,392 | 5/1957 | Cutrera | 452/137 |
| 2,825,929 | 3/1958 | Thornton | 452/137 |
| 2,840,851 | 7/1958 | Verlander | 452/3 |
| 3,126,576 | 3/1964 | Johannesen | 452/3 |
| 4,524,490 | 6/1985 | Newville | 452/6 |
| 4,738,004 | 4/1988 | Capeyre | 452/158 |
| 4,920,612 | 5/1990 | Moore | 452/137 |
| 4,945,607 | 8/1990 | Akesson et al. | 452/135 |
| 4,967,446 | 11/1990 | Padel | 452/6 |
| 5,015,252 | 5/1991 | Jones | 30/155 |
| 5,529,534 | 6/1996 | Adams | 452/135 |
| 5,800,256 | 9/1998 | Bermudez | 452/6 |

FOREIGN PATENT DOCUMENTS 270722  10/1927  United Kingdom .

OTHER PUBLICATIONS

*Sunset Fish & Shellfish A to Z*, Sunset Magazine, 1989, pp. 23, 33, 40, 42, 44, 48, 63, 64, 73, 75, 80, 81, 92, and 93.

*The Freshwater Angler Cleaning & Cooking Fish*, Cowles Creative Publishing, 1982, pp. 2, 10–23, 25, 47, 51, 66, 67, 74, 76, and 77.

*James Peterson Fish & Shellfish The Cook's Indispensable Companion*, by James Peterson,William Morrow and Company, Inc., 1996, pp. 17, 18, and 24–32.

*Perfect Fish Classics*, by Anne Willan, DK Publishing, Inc., 1993, pp. 17, 37, 53, 61, 71, 83, 102, 105, 107, and 108.

*Shrimp Tool*, Good Cook, Bradshaw International, Inc., cooking utensil.

*Primary Examiner*—Willis Little
*Attorney, Agent, or Firm*—Vance, Romero & Montague, P.S.

[57] ABSTRACT

Apparatus and methods for removing skin, membranes, bones, cartilage, antennae, legs, shell, beard and/or veins from seafood prior to, during and/or after the seafood is cooked. The apparatus generally having: (a) measuring means for locating bones within the seafood; (b) cutting means for separating the skin, membrane, bone, cartilage, antennae, legs, shell, beard or vein from the seafood; and (c) pinching means for gripping and removing the skin, membrane, bone, cartilage, antennae, legs, shell, beard or vein from the seafood. The apparatus may further comprise such elements as, but not limited to: (d) handle means for holding and manipulating the measuring means, cutting means, or pinching means during use of the apparatus; (e) gripping means for enhancing the ability to securely grip the handle means during use thereof; and/or (f) means for selectively removing the cutting means from the handle means for easy cleaning thereof.

23 Claims, 4 Drawing Sheets

5,947,808

SEAFOOD SKIN, MEMBRANE, BONE, CARTILAGE, ANTENNAE, LEG, SHELL, BEARD AND/OR VEIN REMOVAL APPARATUS AND METHODS FOR USE THEREOF

COPYRIGHT NOTICE

© Copyright 1998, James R. Vance. All Rights Reserved.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNICAL FIELD

This invention relates to apparatus and methods for removing skin, membranes, bones, cartilage and/or veins from seafood prior to, during and/or after the seafood is cooked.

BACKGROUND ART

Within this immense and beautiful world of ours, seafood is one of our most important, prolific and tasteful resources and delights. Seafood is not restricted to a single food source. Rather, there seems to be an endless number of different types of seafoods available and eaten throughout the world. Furthermore, the methods and recipes for cooking such delicacies are innumerable. It appears as though the only limitations to our enjoyment of such foods are those dictated by our own geographical and/or cultural barriers.

Some examples of the seafood oftentimes available in many large supermarkets, grocery stores and/or fish markets include: fish, such as salmon, trout, halibut, tuna, swordfish, sturgeon, cod, lingcod, flounder, sole, bass, sea bass, herring, sardine, alewife, butterfish, bluefish, buffalo, barracuda, bluefish, badquetta, bluenose, catfish, croaker, caviar, carp, chilean, cobia, croaker, drum, eel, flake, grouper, haddock, hake, hoki, john dory, jack, amberjack, jack cravelle and travalle, kingklip, mackerel, mullet, monkfish, mahi mahi, opah, ocean pout, orange roughy, opah or moonfish, pollock, perch, pike, papio, pompano, rockfish, sea bream, snapper, shad, snook, shark, tilapia, tilefish, tautog, hawaiian ta" ape, hawaiian ulua, whiting, walleye, whitefish, wolfish, wahoo, yellowtail; shellfish, such as abalone, clams, crabs, crawfish, crayfish, lobsters, prawns, mussels, scallops, shrimp and oysters; and other sea life like octopus, squid, cuttlefish, sea urchins, and the list could go on seemingly endlessly.

There are also a myriad of different ways to prepare and cook such seafood. For example, many seafoods can be barbecued, staked over an open fire, roasted, smoked, broiled, baked, boiled, steamed, kebabed, microwaved, sauteed, poached, pan-fried, oven-fried, deep-fried, pickled, chowdered, stewed, and placed in pies, sauses, sushi, quiche, salads, meat loafs, broths, pate, and in many more dishes.

One of the most popular and commonly used methods to prepare and cook fish, and particularly salmon, stealhead-trout, halibut, cobia and swordfish, is to barbeque. Prior to cooking, the fish is usually first cut into individual steaks or is filleted. When cut into steaks, the fish is cut across its girth in approximately one inch to two inch (1"–2") thick segments. In other words, the fish is cut perpendicularly or tangentially to its overall length to form a plurality of thick fish steaks. The corresponding portions of the outer skin, the abdominal membrane or lining, the backbone, the ribs, the pin bones, the lateral bones and/or the Y bones are usually left within each steak.

The fish steaks are then barbecued with the meat or flesh being placed directly upon the barbecue grill. If hot enough, the barbecue grill brands the meat or flesh along the lengths of each grill element to impart a traditional barbecued appearance, texture, and flavor to the fish.

Heretofore, the foregoing cooking methods had several significant disadvantages. Even though oysters and sardines are often eaten whole, in most cases, the seafood must be first gutted to remove the vitals and internal organs of the creature. The seafood is then usually cleaned prior to cooking and consumption. Even after the seafood is gutted and cleaned, the skin, abdominal membrane or lining, fins, backbone, rib bones, pin bones, Y bones, veins, antennae, legs, head, shells, etc., are often not removed until after the seafood is cooked and about to be eaten.

There are reasons for retaining these undesirable and inedible parts of the seafood until after the seafood is cooked and about to be eaten. The first reason is that the overall structure and appearance of the cooked seafood would be significantly damaged if such parts are removed. The second reason is that much of the edible meat is lost in the process of removing such parts prior to cooking. The third reason is that such parts often impart a unique, natural flavors and juices to the edible portions of the seafood during the cooking process. The fourth reason is that heretofore the current invention was unknown and unavailable for use.

In the case of cooking fish, each fish is usually surrounded or nearly surrounded by a segment of outer or exterior skin. The skin helps to keep the meat or flesh of the fish intact while cooking. Many times, this outer or exterior skin still has fish scales attached thereto. The abdominal cavity of the fish is naturally covered with a tissue-like membrane or lining. Each fish steak or fillet also has fish bones imbedded within its meat or flesh.

The bone structure can be specific for each of the various species of fish. For example, salmonoids have numerous very small pin bones that extend outwardly from each side of the vertebra, backbone, or spine. Jack mackerel have rows of tiny, shallow surface bones along the lateral strip on each side thereof. Northern pike, muskellunge, and pickerel have a row of Y-shaped bones that float just above the ribs. These Y bones run lengthwise along the fillet, ending above the fish vent.

Bone structure is not the only distinguishing feature between various species of fish. For example, monkfish have a silvery and very tough membrane between the outermost skin and the meat or flesh of the fish that should be removed prior to cooking. A knife and the cook's fingers are usually used to separate the silvery membrane from the meat. Because of its tapering shape, monkfish is difficult to pan fry unless it is sliced, preferably into three-eights-of-an-inch to three-quarters-of-an-inch (⅜" to ¾") slanting slices, somewhat similar to a traditional fish steak.

Mussels and other shell fish frequently will have a beard or a plurality of attachment membranes that should be removed therefrom prior to cooking.

With crawfish, crayfish, shrimp and lobster, the vein or sand vein often cannot be removed therefrom until after the food is cooked. The stomach sac behind the head is usually not removed until after the lobster is cooked.

In nearly all instances prior to eating fish, the inedible and rather disgusting fish scales, outer or exterior skin, abdominal cavity membrane or lining, and all bones are removed from the meat. Heretofore, the removal of these inedible parts was a very difficult and time-consuming task.

If desired, a cook could run his or her fingers over the surface of a fish steak or fillet in an effort to locate the small, stiff pin bones imbedded within the meat. The discovered pin bones could then be plucked out using common pincers, tweezers, or a pair of needlenose pliers. More commonly, the pin bones are removed by the cook pinching the bones between the his or her thumb and a small knife blade held in the same hand and pulling the bones away from the meat with a twisting action.

The removal of such inedible parts of the fish preferably occurs when the fish is still very hot, immediately after the fish is removed from the heat source, such as from the barbeque or grill. This is also the same time when the fish is nearly too hot to touch or handle. Once removed from the heat source, the fish will cool very rapidly. When very hot, the inedible parts of the fish can usually be more easily and readily removed than after the fish is cooled and the meat and fat become more congealed and solid.

There is a very limited time period during which the fish can be served in a preferably hot or warm state. If removal of the inedible parts of the fish takes too much time, the fish meat becomes cold, congealed, more solid, and much less appetizing.

Some other problems with removing the inedible parts of a fish include: (a) being required to handle the fish when it is very hot and can burn a person's fingers and hands; (b) being required to hold and touch the cooked fish with the person's fingers in order to remove such inedible parts and, thereby, expose one's fingers and hands to fatty-tissue residue of the fish which very quickly cools, congeals, and becomes a sticky, uncomfortable, troublesome mess, which is difficult to remove and makes a mess of everything else that is touched; (c) it is almost impossible to locate and remove all of the small, nearly transparent, internal pin bones, lateral bones, and/or Y bones out of the fish before the meat has cooled below the preferable serving temperature; and (d) the removal of such small, nearly transparent, internal bones from the fish with traditional eating utensils significantly damages the structure of the fish and renders it nearly to a pile of mutilated fish meat. This later problem is particularly true when the fish is being served by a parent to his or her young child and removal of all fish bones is essential to prevent the child from choking on an undiscovered but swallowed fish bone.

Due to many of the foregoing problems, commercial establishments, such as restaurants, usually do not remove the small, nearly transparent, internal bones from fish and trust that the customer or patron will discover and remove them from their meal.

Establishments such as hospitals, clinics, retirement homes, daycare centers, restaurants, cafeterias, schools, etc., often elect to not serve fish to their patients, charges or customers due to the potential liability of serving fish with tiny bones therein. This is truly unfortunate considering the widely recognized enhanced food value found within fish.

An inexperienced person in these matters might suggest that such inedible parts of the fish should be removed prior to cooking. However, it is preferable to retain the fatty outer or exterior skin upon the fish to enhance the flavor of the fish during cooking, to keep the meat together, and to keep the meat from drying out during the cooking procedure. It would be nearly impossible to remove all of the bones from the fish and have the fish maintain its conventional shape, appearance, and structure during the cooking process.

Heretofore, persons used traditional eating utensils such as a table knife, fork and/or spoon in an effort to remove the inedible or at least the undesirable parts from the fish immediately before or during consumption of the fish.

The removed inedible or undesireable parts of the fish are generally left on the serving platter, the person's plate, or are placed upon a side dish, all of which are in plain open view of all person's within the vicinity. The appearance of such inedible or undesireable parts of the fish are not attractive. It is preferable that such inedible parts of the fish be removed prior to the fish being served to the consumer.

In an initial effort to address these problems, the current inventor created the devices shown and discussed within U.S. Pat. No. 5,529,534, which issued on Jun. 25, 1996.

It is firmly believed that the above-listed information, whether taken alone or in combination, neither anticipate nor render obvious the current invention. The foregoing explanation does not constitute an admission that such information or devices are relevant or material to the appended Claims. Rather, such information and devices relate only to the general field of the current disclosure and constitute the closest art of which the inventor is aware.

DISCLOSURE OF INVENTION

After the issuance of the above-mentioned patent, the inventor continued to refine and improve upon the concepts introduced therein. Additional experimentation and significant reflection on the above-identified problems were invested by the inventor. These efforts ultimately resulted in the new improvements, apparatus, concepts, structure and methods taught in the following description and appended drawings.

The current invention can be used to manufacture a wide variety of different multi-purpose culinary tools and cooking implements that enable a person or cook to remove the outer skin, abdominal inning or membrane, bones, cartilage, antennae, legs, shell, beard and veins from seafood before, during, and/or after the seafood is cooked, without exposing the person or cook to a danger of being harmed, cut, or burnt. This invention can be used for other purposes as well, which will be discussed further below.

The user of this invention can effectively remove the inedible and/or undesirable portions of the seafood without having to actually or physically touch the seafood with his or her hands or fingers. Consequently, the seafood can be prepared without the hands or fingers of the cook or person contaminating the seafood or distributing the cooked, sticky, fatty tissue of the seafood onto other objects or the surrounding food preparation areas.

The apparatus of this invention can be used as a cooking spatula to scoop up and deliver the uncooked seafood to the cooking surface.

The apparatus of this invention can be used as a serving spatula to scoop up and deliver the cooked seafood to a serving tray or dish.

The apparatus of this invention can be used as a spreading implement to spread butter, peanut butter, jam, preserves, icing, or any other type of spreadable food as desired.

If manufactured from a durable and relatively stiff material, the apparatus of this invention can also be used to shuck oysters, clams, mussels and other mollusks.

To achieve the foregoing objectives and other objectives that will be discussed hereafter, and to overcome all of the disadvantages discussed above, the apparatus of the current invention generally comprises the combination of: (a) measuring means to assist in the locating of at least a portion of the bones within seafood, such as within fish; (b) cutting means for separating skin, membrane, fatty tissue, discolored tissue, bone, cartilage, antennae, legs, shell, beard or veins from the seafood; and (c) pinching means for gripping and removing the skin, membrane, fatty tissue, discolored tissue, bone, cartilage, antennae, legs, shell, beard or veins from the seafood.

It should be noted that the measuring means is generally used when the cook or person is trying to locate the vertebra, backbone, vertebral column, neural spine, hemal spine, radial cartilage, fin rays, bones, ribs, pin bones, lateral bones, and/or Y bones found within seafood, and particularly within fish steaks. In essence, the measuring means comprises or defines a measuring device having one or more gauges each having a predetermined angle. During use of the measuring means, one or more of the gauges is placed upon or juxtaposed near to the seafood, such as against a fish steak. The outer contours or other markings of the gauge identify or indicate where within the seafood such inedible and/or undesirable portions thereof are located. For example, the measuring means may indicate where within a fish steak one or more rows or areas of pin bones or Y-bones should be located. By way of example, the measuring means, and more particularly the gauge, may identify the angle, distance and/or span between the neural spine bones and the side lateral bones within a fish steak as found within a halibut steak. The angle between the neural spine bones and the side lateral bones within a halibut steak is typically a right angle of about ninety degrees (90°). There may be some variation in this specific angle between various different fish within a designated species, or between different species. However, the measuring means of this invention will direct the user's attention to fairly close, if not directly to, the location of such sought after bones or cartilage.

Similarly, the measuring means or gauge can identify the distance or span between each opposed rows of pin bones located on each side of a fish. Usually, such pin bones are found extending outwardly from the backbone or spine of the fish and are positioned at a similar angle from the generally vertical or upper neural spine bones of the fish. It is the inventor's experience, that each respective side of a salmon fish steak has five (5) pin bones therein.

The measuring means or gauge of this invention can also be used to identify the location of where the floating Y bones should be located within a fish.

Any desired element, edge or marking on the apparatus can be used as the gauge.

For example, one or more portions of the element forming the pinching means may define one or more legs or rays which will be used to locate a desired, predetermined measurement angle. Similarly, one or more portions of the element forming the cutting means may define one or more of the other, opposed or opposite legs or rays which combine with the legs or rays found on the pinching means to define the desired, predetermined measurement angle therebetween.

In other words, the pinching means and the cutting means are placed in such a manner as to form a general chevron shape or orientation to one another, similar to the shape of a boomerang. Thus positioned, the pinching means and cutting means may each have a first side or first edge that generally face one another to form a first gauge.

A first predetermined angle of the first gauge is defined by the angle generally located between the first side or first edge of the pinching means and the first side or first edge of the cutting means. The first predetermined angle may be an acute angle, right angle, an obtuse angle, or any angle of less than one-hundred-eighty degrees (<180°). When used with a salmon steak, the first predetermined angle has an angle of between about forty degrees and one-hundred-and-twenty degrees (between 40° and 120°), and most preferably about one-hundred-fifteen degrees (115°).

Other species of fish may require modification or alteration of this preferred angle of the measuring means preferably located between the pinching means and the cutting means. For example, the angle between the neural spine bones and side lateral bones in a halibut is approximately ninety degrees (90°). Consequently, the angle of the measuring means should be approximately ninety degrees (90°) when this apparatus is used with halibut steaks.

The pinching means and cutting means may also or alternatively each have a second side or second edge that generally face away from one another to form a second gauge. The second gauge may have a reflex angle located between the respective legs or rays thereof. In other words, the outermost sides or edges of the pinching means and of the cutting means that are opposite or opposed to the aforementioned facing sides or edges may define a second gauge having a second predetermined angle between these second or outermost sides or edges of the pinching means and of the cutting means, respectively. The second predetermined angle is generally a reflex angle of greater than one-hundred-eighty (>180°). More particularly, the second predetermined angle preferably has a reflex angle of between about two-hundred-and-forty degrees and three-hundred-and-twenty degrees (240° to 320°).

With both the first gauge and the second gauge, the vertex of the angle is generally placed over the center of the backbone or vertebrae on a fish steak.

Alternatively, the pinching means may define a first elongated member having a first elongated axis. Similarly, the cutting means may define a second elongated member that has a second elongated axis. With this structure, the predetermined angle can be easily defined by the angle generally located between the first axis and the second axis.

The cutting means and the pinching means can be used beneficially with nearly all types of seafood. For example, the cutting means can be used to separate the outer skin and abdominal membrane or lining from the edible meat of fish. The cutting means can be used to separate bone or cartilage from seafood, such as from fish, shark, squid, and other sea creatures. The cutting means can be used to separate the antennae, legs, shell and/or veins from the edible parts of shrimp, crawfish, crayfish, lobster, crab, and other similar sea creatures. If needed, the cutting means could also be used to scrape and/or remove the beard from mussels and barnacles. If manufactured from a relatively stiff material, such as from a hard plastic or metal, the cutting means could also be used to open and shuck oysters, clams, mussels, and other bivalves or mollusk.

Similarly, the pinching means can be used to grip and remove the beard from mussels and barnacles. The pinching means can be used to grip and remove the outer skin, the abdominal membrane or lining, and all bones from fish. Such bones include, but are not limited to the vertebrae, backbone or spine of the fish, the rib bones, the lateral bones, the fins, the tail, the pin bones, and the Y bones. The pinching means can be used to grip and remove the cartilage found within squid, shark, and other sea creatures. The pinching means can also be used to grip and remove the antennae, legs, pinchers, shell and/or veins from shrimp, crawfish, crayfish, lobsters, crab and other sea creatures.

For example, the pinching means can be used to remove shell material to expose crab meat for consumption. Then, the cutting means can be used to reach into the remaining portion of crab shell and remove the remaining crab meat.

The cutting means can also be used to split the shell on the back of shrimp, prawns, crayfish, and/or crawfish. The pinching means can then be used to grip and review the vein running along the arched back of that seafood. Alternatively, the cutting means can be used to split, expose, and then remove the vein from the meat.

Please note that within this disclosure the term "acutting" can be used interchangeably with the term "separating". For example, after a fish is cooked, there really is no need to "cut" the fish. Rather, a cooked fish is very tender and will often fall promptly apart when handled. Consequently, the outer skin, abdominal membrane, and bones usually only need to be located and then gently separated or urged apart and then be removed from the cooked meat.

The cutting means has at least a first cutting or separating edge.

If desired, the cutting means may be double-sided and have a first cutting edge and an opposed second cutting or separating edge.

Preferably, the cutting means is blunt and unable to cut a finger or a hand of a user.

More particularly, the measuring means, cutting means and pinching means are preferably manufactured from a plastic, metal, or composite material that will not scratch, mar, deface, or destroy the TEFLON or non-stick coatings that frequently are found on modern frying pans, baking pans, cookie sheets, and on other cooking surfaces.

The cutting means and/or pinching means may also be used as a spreading implement to spread butter, peanut butter, jam, preserves, icing, or any other type of spreadable food as desired.

The pinching means comprises a pair of elongated arms or jaws that generally form a pair of operable tweezers, pincers, pliers, or the like.

Within the preferred embodiment of this invention, each pair of arms or jaws of the pinching means are manufactured or molded into a single unitary or integral housing. The material from which these arms or jaws are manufactured have sufficient give, forgiveness, or elasticity to enable the arms or jaws to be pressed together tightly without breakage. Upon releasing such pressure, each of the arms or jaws should retract back to their respective original or near original positions relative one to another.

Within the preferred embodiment of this invention, only one pair of operable tweezers, pincers or pliers are used.

Within an alternative embodiment of this invention, the pinching means comprises at least a first pair of elongated tweezers, pincers or pliers and a second pair of elongated tweezers, pincers or pliers.

If two pairs of elongated tweezers, pincers or pliers are used, the aforementioned measuring means or gauges of one or more predetermined angles can be located therebetween. In other words, the first pair of elongated tweezers, pincers or pliers may serve as a first leg or ray of the angle. The second pair of elongated tweezers, pincers or pliers serve as a second leg or ray of the angle, with the desired, predetermined angle being positioned between the first and second pairs of elongated tweezers, pincers or pliers in a nearly identical manner as described above for the measuring means and the cutting means. For example, the first pair of elongated tweezers, pincers or pliers and the second pair of elongated tweezers, pincers or pliers may each have a first side or first edge that generally face each other. The angle between these respective first sides or first edges of the first and second pair of elongated tweezers, pincers or pliers generally defines the measuring means or gauge of a first predetermined angle.

Similarly, the first pair of elongated tweezers, pincers or pliers and the second pair of elongated tweezers, pincers or pliers may each have an opposed second side or second edge that generally face away from each other. The angle between these respective second sides or second edges of the first and second pair of elongated tweezers, pincers or pliers generally defines the measuring means or gauge of a second predetermined angle.

Alternatively, the first pair of elongated tweezers, pincers or pliers may have a first axis. The second pair of elongated tweezers, pincers or pliers has a second axis. The predetermined angle can then defined by an angle generally located between the first axis of the first pair of elongated tweezers, pincers or pliers and the second axis of the second pair of elongated tweezers, pincers or pliers.

For purposes of clarity, the first pair of elongated tweezers, pincers or pliers will be hereinafter simply referred to as the first pair of tweezers. Similarly, the second pair of elongated tweezers, pincers or pliers will be hereinafter simply referred to as the second pair of tweezers. This simplification, however, should not be interpreted as a limitation or exclusion of these alternative structures for the pinching means.

In addition to use as a measuring gauge, the combination and chevron placement of the pinching means and the cutting means, or of the first pair of tweezers and the second pair of tweezers, can operate as a spatula to scoop up seafood, cookies, brownies, or any other types of foods.

To accomplish this purpose of operating as a spatula, it is preferable that the cutting means and the pinching means, as found within the first embodiment of this invention, should be oriented within a common or nearly parallel plane. In other words, the cutting means may be generally oriented within a first plane and the pinching means be generally oriented within a second plane, with the first plane being generally parallel to or coplanar with the second plane.

Within an alternative embodiment of this invention, a first pair of tweezers and a second pair of tweezers are used and oriented to have a chevron shape or configuration, similar to the shape of a boomerang. Within this embodiment of the invention, the first pair of tweezers and the second pair of tweezers may be oriented within a common or nearly parallel plane. In other words, the first pair of tweezers may be generally oriented within a first plane and the second pair of tweezers is generally oriented within a second plane, with the first plane being generally parallel to or coplanar with the second plane.

This invention is not restricted, however, to coplanar or parallel orientation of the cutting means and the pinching means. To the contrary, as shown within the accompanying drawings, the cutting means may be oriented within a first plane that is generally tangential, orthogonal or perpendicular to the second plane of the pinching means.

The apparatus of this invention may also comprise handle means for holding and manipulating the measuring means, the cutting means, and/or the pinching means during use. For example, the handle means can be operatively secured to or formed integrally with the measuring means, the cutting means, and/or the pinching means. The handle means may comprise a simple, elongated, manually-gripable handle. The handle means may comprise a bulbous element or handle that is designed according to ergonomic considerations. Alternatively, the handle means may be configured to have a distinctive or unique shape to serve as trade dress for a particular manufacturer of this invention.

Furthermore, the apparatus may be additionally provided with gripping means for enhancing the ability of a user to securely grip the handle means during use of the apparatus. For example, the gripping means may be operatively secured to or formed integrally with the handle means. The gripping means may comprise one or more indentations, bumps, grooves, ridges, or other structure like that increase the frictional contact between the handle means and the user of the apparatus. Alternatively, or in addition thereto, the gripping means may comprise a full or partial sleeve that can be pulled or rolled over the handle means to increase the frictional grip of the handle means.

If needed or desired, the apparatus may be provided with means for selectively removing the cutting means from the measuring means, from the pinching means, and/or from the handle means. This feature is particularly helpful to assist in the quick and easy cleaning of the cutting means.

The cutting means may also be provided with one or more holes or apertures therein. Such holes or apertures may be beneficially used to lighten the weight of the apparatus, or impart a unique shape or pattern to the apparatus as a whole. For example, the apparatus of this invention may suggest the overall appearance of a stylized fish or other sea creature with the hole suggesting the location of an eye, mouth, tentacle, or other portion of anatomy. If desired and size properly, the hole or aperture may also be beneficially used to enable the apparatus to be held and supported upon a nail, hook, peg, or similar structure.

One of the special benefits of this invention is that all of the aforementioned benefits are derived from a single tool or implement. There is no longer a need to purchase, clean and store a myriad of different cooking implements or tools. Use of the current invention achieves all of these desired objectives within a single unitary or integral culinary implement. In other words, the measuring means, the cutting means, the pinching means, and the handle means, if used, can be and preferably are integral or unitary in structure.

Since the cutting means is secured to or formed integrally with the measuring means, and the pinching means is secured to or formed integrally with the measuring means or with the cutting means, all of these elements are interconnected, interrelated, integrated and/or unitary in structure. In essence, there are multiple tools within a single tool.

It is no longer necessary to manufacture numerous, different, stationary and movable parts that are bolted or screwed together in an effort to achieve some of the above-stated objectives. It is no longer necessary to have a moving knife blade that can be moved from a hidden nonoperative position to an extended operative position. It is no longer necessary to have a locking mechanism to keep the movable knife blade in its intended position.

Within the preferred embodiment of this invention, it is no longer even necessary to have a handle.

This invention eliminates use of a multiplicity of individual and separate component parts, which were heretofore believed to be essential to address some of the above-stated concerns. Consequently, connection points, seams, and joint lines, where contaminants and bacteria might hide are eliminated from the invention. The danger that such multiplicity of individual and separate component parts might break apart is also eliminated.

The ability to manufacture, clean, and maintain the apparatus of the current invention is dramatically improved over this inventor's earlier invention.

The apparatus of this invention can be easily, quickly and inexpensively manufactured using an injection molding process or a vacuum molding process, with each component part or feature being created at nearly the identical time during the same molding process. Only a single mold needs to be created for each embodiment of the invention, thus, significantly reducing manufacturing costs.

The current invention also contemplates a method for removing skin, membrane, bones, cartilage, antennae, legs, shell, beard or vein from seafood prior to, during, or after the seafood is cooked. The method generally comprises the steps of:

(a) placing an apparatus having measuring means adjacent to the seafood to locate the bones within the seafood;

(b) using cutting means to separate the skin, membrane, bone, cartilage, antennae, legs, shell, beard or vein from the seafood; and (c) using pinching means to grip and remove the skin, membrane, bone, cartilage, antennae, legs, shell, beard or vein from the seafood.

Each of the aforementioned accessories and other accessories and attachments will be described in greater detail further below. Please note that the structure and various accessories of the current invention enable the apparatus to be selectively used for any number of purposes.

The preferred and several different alternative embodiments of the apparatus, and associated structures, of the current invention and the processes for manufacture and use thereof are further described in greater detail in the following description, Claims, and drawings of this Specification. However, to avoid any possible confusion as to the scope of the current invention, each of the following sections, claim language, and the drawings of this Specification in their entirety are incorporated within this section by this reference.

The foregoing and other objectives and advantages of the current invention will become more readily apparent upon reading the following disclosure and referring to the attached drawings.

Figure 1:
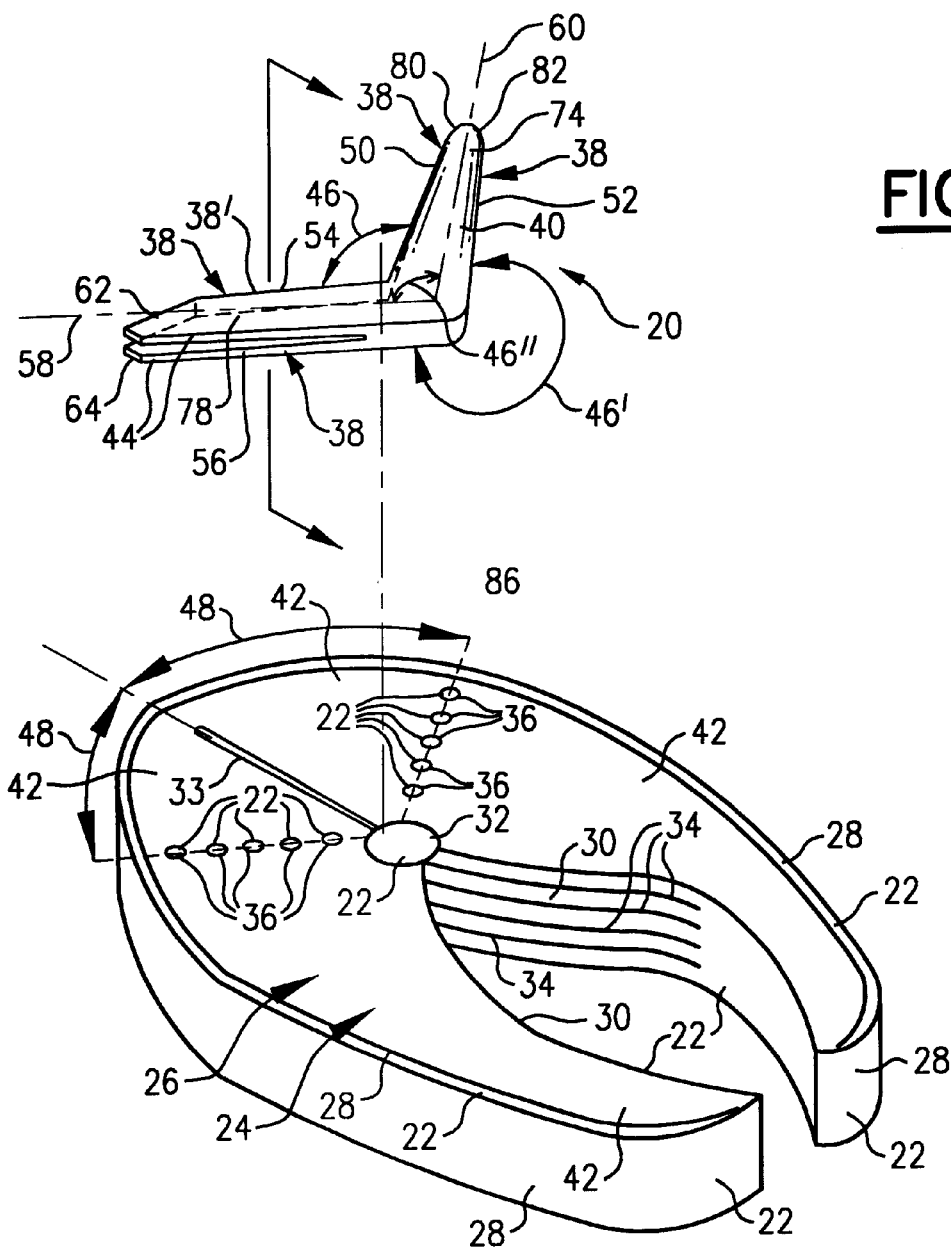
FIG. 1 is a perspective view of a first embodiment of the current invention, made in accordance with the teachings of this disclosure, with the apparatus placed above a conventional salmon fish steak to demonstrate use of the apparatus to locate or measure the placement of two rows of pin bones found within the meat of the fish steak.

One should understand that the drawings are not necessarily to scale and the elements are sometimes illustrated by graphic symbols, phantom lines, diagrammatic representations, and fragmentary views. In certain instances, the inventor may have omitted details which are not necessary for an understanding of the current invention or which render other details difficult to perceive.

BEST MODE FOR CARRYING OUT THE INVENTION

Referring to the attached drawings, wherein like numerals indicate like parts, the current invention generally comprises an apparatus 20 for removing inedible or undesirable portions 22 from seafood 24, such as from a fish steak 26. The inedible or undesirable portions 22 may comprise outer or exterior skin 28, abdominal lining or membrane 30, backbone, vertebrae 32 or vertebral column, neural spine bones 33,, rib bones 34, pin bones 36, hemal spine, cartilage, radial cartilage, fin rays, lateral bones, Y bones, antennae, legs, shell, beard or veins from the seafood 24 prior to, during, or after the seafood 24 is cooked.

Within its simplest and first embodiment, as shown within FIG. 1, the apparatus 20 generally comprises the combination of: (a) means 38 for measuring or locating the pin bones 36 within the seafood 24; (b) means 40 for cutting or separating the skin 28, membrane 30, vertebrae 32, neural spine bones 33, rib bones 34, hemal spine, cartilage, radial cartilage, fin rays, lateral bones, Y bones, antennae, legs, shell, beard or veins from meat 42 of the seafood 24; and (c) means 44 for pinching, gripping and removing the skin 28, membrane 30, vertebrae 32, neural spine bones 33, rib bones 34, pin bones 36, hemal spine, cartilage, radial cartilage, fin rays, lateral bones, Y bones, antennae, legs, shell, beard or veins from meat 42 of the seafood 24.

As shown throughout the drawings, the cutting means 40 is secured to or formed integrally with the measuring means 38 and/or with the pinching means 44. Similarly, the pinching means 44 is secured to or formed integrally with the measuring means 38 and/or with the cutting means 40. Within FIGS. 1, 2, 3, 6, 7 and 8, the measuring means 38, cutting means 40 and pinching means 44 are illustrated as unitary in structure one with another.

Figure 9:
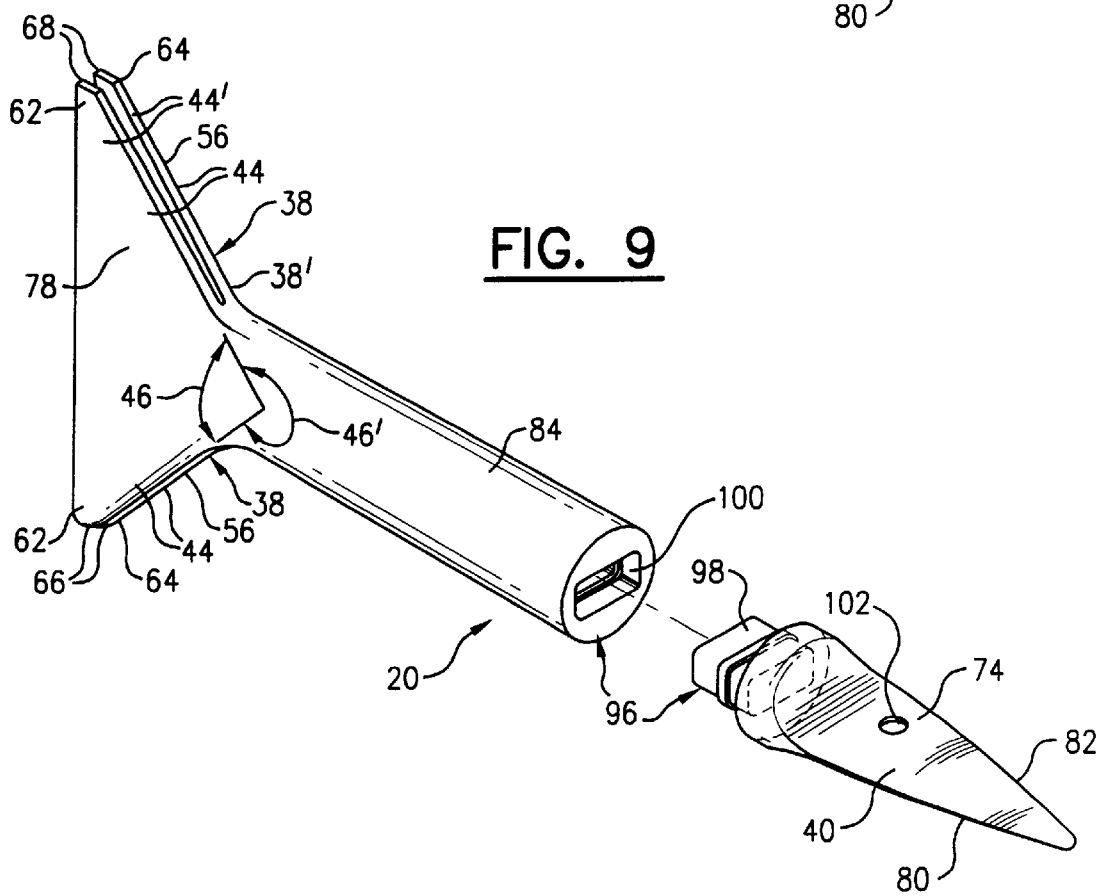
FIG. 9 is an exploded, perspective view of a fifth embodiment of the current invention, illustrating use of a removable cutting means.

Within FIG. 9, the measuring means 38 and the pinching means 44 are illustrated as unitary one with another. However, the cutting means 40 is illustrated in an exploded view as being integral but selectively removable from the measuring means 38 and pinching means 44.

It is intended that the measuring means 38, the cutting means 40, and the pinching means 44 will be manufactured from plastic, metal, or a composite material. More particularly, it is intended that the measuring means 38, the cutting means 40, and the pinching means 44 will be manufactured using an injection molded process or a vacuum molded process.

As first illustrated within FIG. 1, the measuring means 38 generally comprises a gauge 38'. In turn, the gauge 38' defines at least a first predetermined angle 46. When the measuring means 38 or gauge 38' is placed upon or adjacent to the fish steak 26, as indicated within FIGS. 1 and 2 of the attached drawings, the angle 46 indicates the general or specific area or location of the pin bones 36 within the meat 42 of the seafood 24. These pin bones 36 are usually located along two different rows or areas in the meat 42 and are usually located in a successively-spaced, radially-projecting manner radiating away from the vertebrae 32. Furthermore, the pin bones 36 are usually symmetrically located about the neural spine bones 33 and at a similar angle thereto.

For example, depending upon the species of fish cooked, the predetermined angle 46 of the gauge 38' may be between forty degrees and one-hundred-and-twenty degrees (40° and 120°).

The predetermined angle 46 need not be measured from the acute, right, obtuse, or smallest angle shown on the apparatus 20. For example, as seen within FIG. 9, predetermined angle 46' of the gauge 38' may be a reflex angle of more than one-hundred-eighty degrees (>180°), and preferably between two-hundred-and-forty degrees and three-hundred-and-twenty degrees (240° and 320°).

As best shown within FIG. 1, the predetermined angle 46 may be defined by an angle generally located between the pinching means 44 and the cutting means 40. More particularly, the cutting means 40 may have a first side 50 and a second side 52. Similarly, the pinching means 44 may have a first side 54 and a second side 56. A first predetermined angle 46 can be easily defined by the space, distance, or angle between the first side 50 and the first side 54. Similarly, another or second predetermined angle 46' can be easily defined by the space, distance, or angle between the second side 52 and the second side 56.

Alternatively, the pinching means 44 may define a first elongated member having a first axis 58. Similarly, the cutting means 40 may define a second elongated member having a second axis 60. The predetermined angle 46" can then be defined by an angle generally located between the first axis 58 and the second axis 60.

Figure 4:
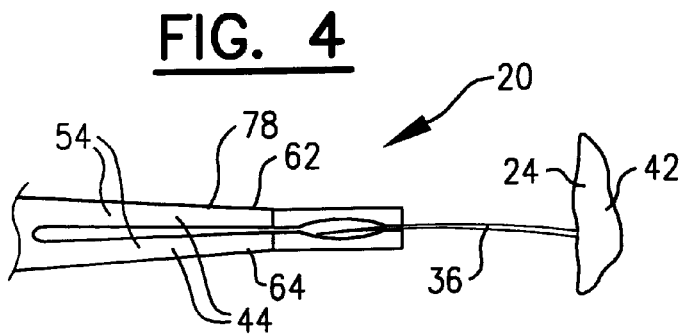
FIG. 4 is a partial, first end-elevational view of the second embodiment of the current invention as shown in FIGS. 2 and 3, indicating the pinching means in a closed position to grip and remove a bone or pinbone.
Figure 3:
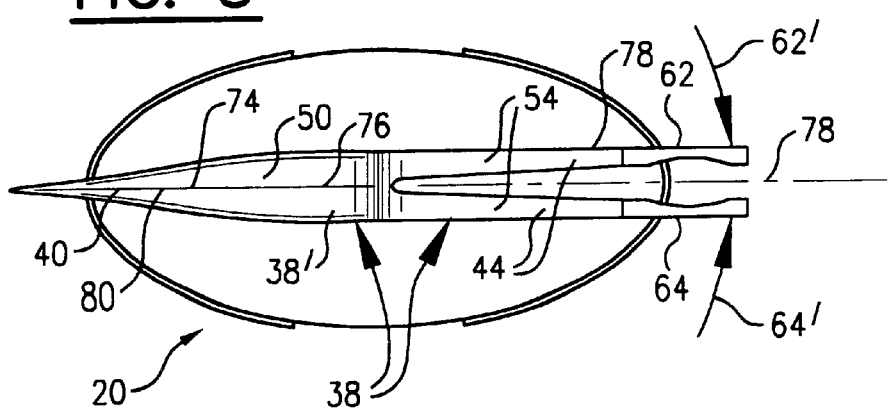
FIG. 3 is a first end-elevational view of the second embodiment of the current invention as shown in FIG. 2, as seen along a plane defined by III—III in FIG. 2.

As best seen within FIGS. 3 and 4, the pinching means 44 generally comprises a pair of elongated members, arms or jaws 62 and 64 that form a pair of operable tweezers, pincers or pliers. When forces are applied to the jaws 62 and 64 as shown by lines 62' and 64', the pinching means 44 will move from an open position shown in FIG. 3 to a closed position shown in FIG. 4. Please note that within FIG. 4, a pin bone 36 is illustrated as being gripped within the jaws 62 and 64 of the pinching means 44 and being removed from the seafood 24 and meat 42.

Figure 2:
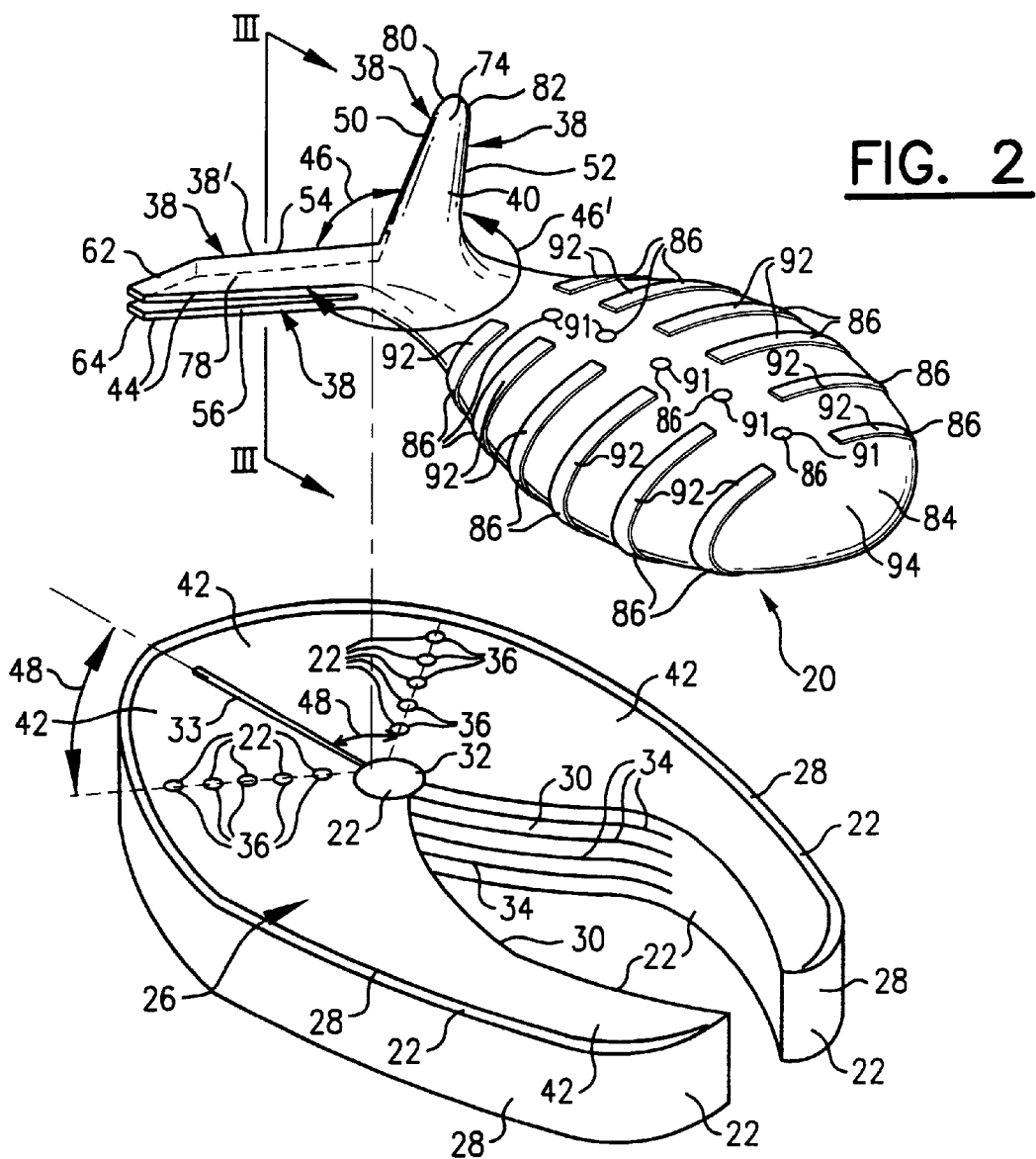
FIG. 2 is a perspective view of a second embodiment of the current invention with the apparatus similarly placed above a conventional salmon fish steak.
Figure 5A:
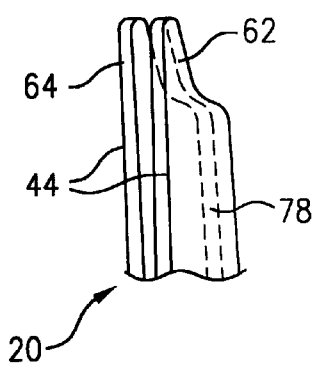
FIG. 5A is a partial perspective view of the terminal ends of a first optional embodiment of the pinching means.
Figure 5B:
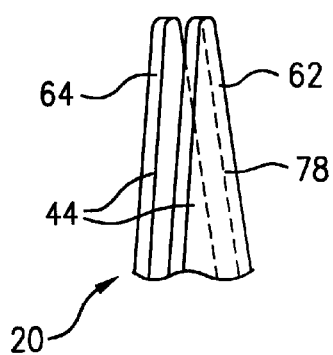
FIG. 5B is a partial perspective view of the terminal ends of a second optional embodiment of the pinching means.
Figure 6:
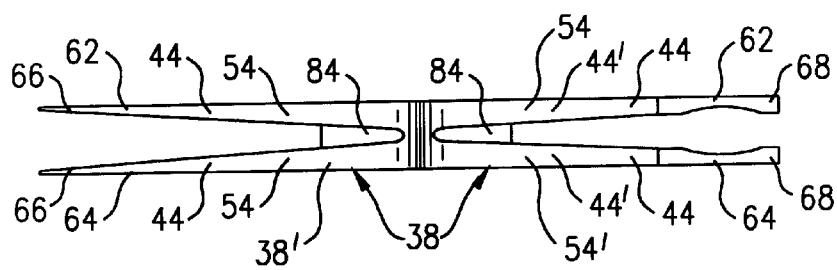
FIG. 6 is a first end-elevational view of a third embodiment of the current invention, as seen along a plane defined by VI—VI in FIG. 7.

FIGS. 1 and 2 illustrate a first embodiment for the structure of the jaws 62 and 64. FIGS. 5A and 5B illustrate two other alternative embodiments for the structure of the jaws 62 and 64. Of course, there are a myriad of different configurations or structures that could be used to construct the jaws 62 and 64. Consequently, the shape or configuration of the jaws 62 and 64, as illustrated within the accompanying drawings, must not be interpreted as being limiting in any manner whatsoever.

As seen within FIGS. 6, 7, 8 and 9, the pinching means 44 may comprise a first pair 66 of elongated tweezers, pincers or pliers and a second pair 68 of elongated tweezers pincers or pliers. Please note that the predetermined angle 46 can just as easily be defined by an angle that is generally located between the first pair 66 of elongated tweezers pincers or pliers and the second pair 68 of elongated tweezers, pincers or pliers.

Similarly, the first pair 66 of elongated tweezers, pincers or pliers may have a first axis 70 and the second pair of elongated tweezers, pincers or pliers may have a second axis 72. The predetermined angle 46 can therefore be defined by an angle 46" measured or located generally between the first axis 70 and the second axis 72. These features are primarily illustrated within FIG. 7.

The cutting means 40 is oriented within a first plane which is generally defined by the flat of the blade 74 or by a plane passing through its centerline 76 (shown in FIG. 3).

The pinching means 44 is oriented within a second plane which is generally defined by the flat of the outside or upper-side of the jaws 62 and/or 64, or is defined by a plane passing through the center line 78 thereof.

As shown within FIGS. 1, 2 and 3, the first plane is generally parallel to or coplanar with the second plane.

Figure 8:
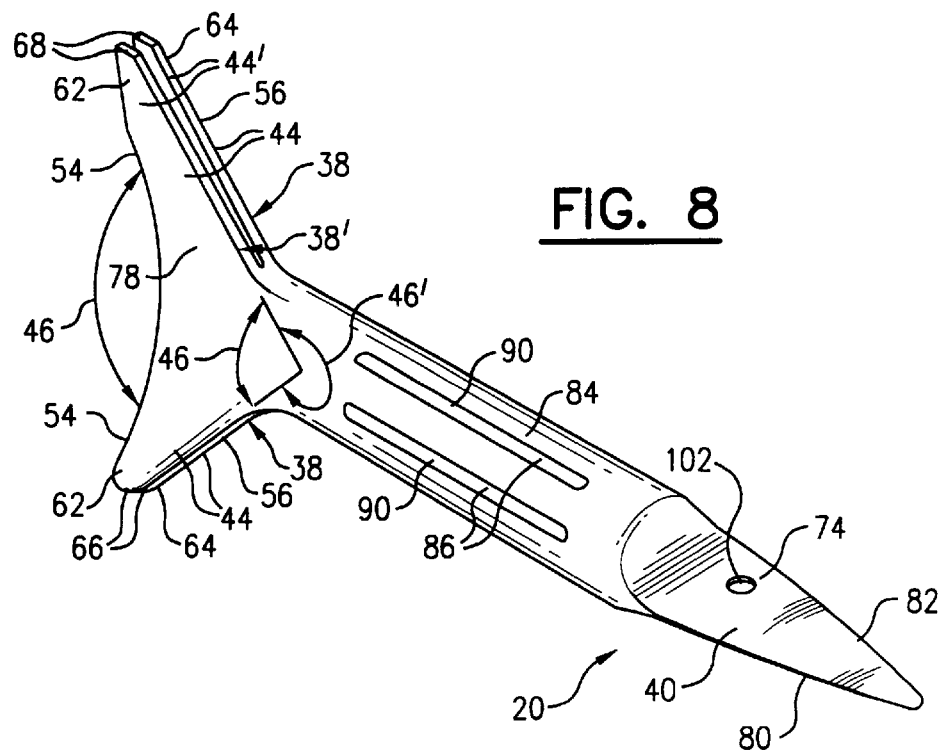
FIG. 8 is a perspective view of a fourth embodiment of the current invention. The fourth embodiment of the current invention is very similar to the third embodiment shown with in FIGS. 6 and 7. However, the knife blade of the cutting means found within the fourth embodiment is located within a plane that is generally tangental, orthogonal, or perpendicular to the planes of the pinching means.

However, within FIGS. 8 and 9, the first plane is generally tangential, orthogonal or perpendicular to the second plane.

Within one embodiment of this invention, the cutting means 40 has at least a first cutting edge 80.

Within an alternative embodiment of this invention, the cutting means 40 has at least a first cutting edge 80 and an opposed second cutting edge 82.

Preferably, the first cutting edge 80 and the second cutting edge 82 are generally blunt and unable to cut a finger or a hand of a user.

As shown within FIGS. 2, 3, 6, 7, 8 and 9, the apparatus 20 of this invention may also include handle means 84 for holding and manipulating the measuring means 38, the cutting means 40 and/or the pinching means 44 during use thereof. The handle means 84 is operatively secured to or formed integrally with the measuring means 38, the cutting means 40 and/or the pinching means 44.

Figure 7:
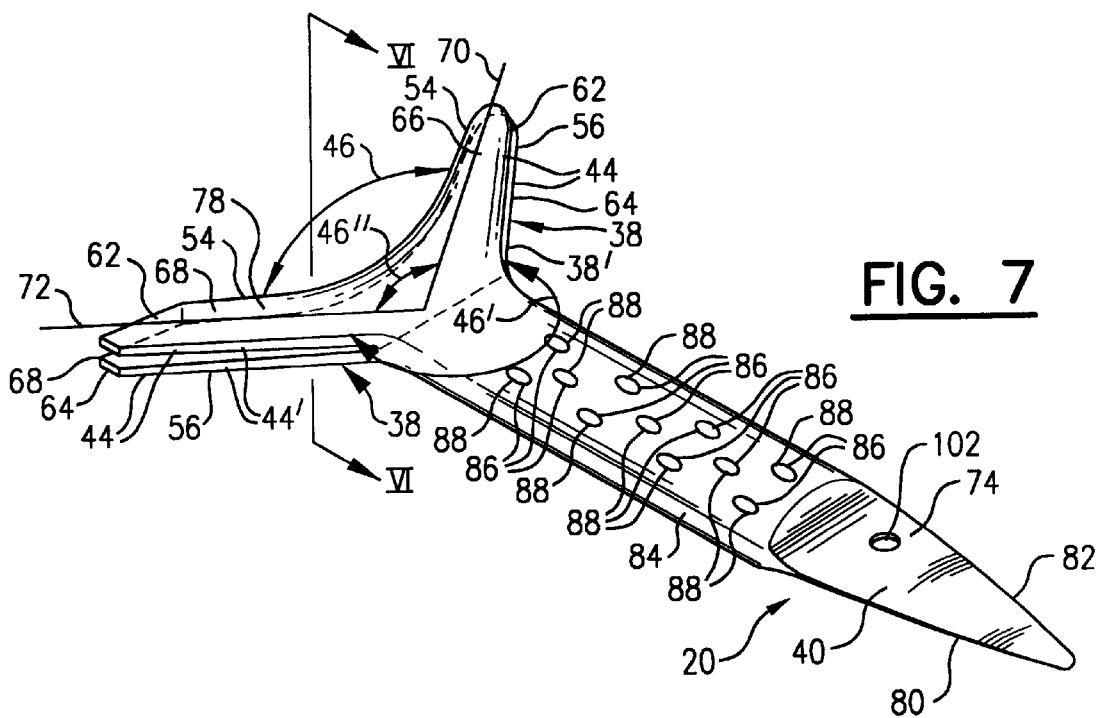
FIG. 7 is a perspective view of the third embodiment of the current invention as shown in FIG. 6. Within the third embodiment of this invention, the knife blade of the cutting means is located within a plane that is generally parallel to the planes of the pinching means.

As shown within FIGS. 2, 7 and 8, the apparatus 20 of this invention may also be provided with gripping means 86 for enhancing the ability of a user to securely grip and manipulate the handle means 84 during use of the apparatus 20. The gripping means 50 may be operatively secured to or formed integrally with the handle means 84. For example, the gripping means 50 may include indentations or dimples 88 as shown within FIG. 7, grooves 90 as shown within FIG. 8, and/or bumps 91 and/or ridges 92 as shown within FIG. 2.

Furthermore, the gripping means 50 may comprise a rubber, latex, or other resilient sleeve 94 that is rolled or pulled over handle means 84.

Referring to FIG. 9, the apparatus 20 of this invention may also include means 96 for selectively removing the cutting means 40 from the measuring means 38, from the pinching means 44, and/or from the handle means 84 for easy cleaning of the cutting means 40. For example, the cutting means 40 may be provided with a plug or tendon 98 that can be selectively inserted into and held within a hole or mortise 100.

The apparatus 20 of this invention may also be provided with one or more apertures or holes 102. FIGS. 7, 8, and 9 illustrate an aperture or hole 102 being located within the cutting means 40. The purpose of this hole 102 is discussed above.

Once the foregoing description and accompanying drawings are studied, the methods or processes of using the above-described apparatus 20 to remove skin 28, membrane 30, bones 32, 33, 34 and 36, cartilage, antennae, legs, shell, beard or vein from seafood prior to, during, or after the seafood 24 is cooked should be readily apparent. In summary, the methods include the steps of:

(a) placing the apparatus 20 described above adjacent to the seafood 24 to locate the bones 32, 33, 34 and/or 36 within the seafood 24;

(b) using the cutting means 40 to separate the skin 28, membrane 30, bones 32, 33, 34 and/or 36, cartilage, antennae, legs, shell, beard and/or vein from the seafood 24; and (c) using the pinching means to grip and remove the skin 28, membrane 30, bones 32, 33, 34 and/or 36, cartilage, antennae, legs, shell, beard and/or vein from the seafood 24.

The means and construction disclosed herein are by way of example and comprise primarily the preferred and several alternative forms of putting the invention into effect. Although the drawings depict preferred and alternative embodiments of the invention, other embodiments are described within the preceding and following text. One skilled in the art will appreciate that the disclosed apparatus and devices may have a wide variety of shapes and configurations. Additionally, persons skilled in the art to which the invention pertains might consider the foregoing teachings in making various modifications, other embodiments, and alternative forms of the invention. It is, therefore, to be understood that the invention is not limited to the particular embodiments or specific features shown herein. To the contrary, the invention is claimed in all of its various forms, including all modifications, equivalents and alternative embodiments which fall within the legitimate and valid scope of the appended Claims, appropriately interpreted under the Doctrine Of Equivalents.

INDUSTRIAL APPLICABILITY

The current invention may be used by commercial or layman cooks at restaurants, hotels, motels, hospitals, clinics, retirement homes, day care centers, cafeterias, schools, on picnics, at home in the kitchen, or at the neighborhood backyard barbecue. In essence, this invention could be used by anyone who could benefit from using simple, reliable, easily used apparatus for removing an outer skin and internal bones from the meat of a fish steak prior to, during, and/or after a fish steak is cooked. Other applications for the apparatus of this invention could be easily found. For example, the current invention could be used as a common household kitchen implement or utensil to cut and remove cookies, brownies, fudge, etc., from a cookie pan or cake pan. Similarly, the current invention could be used to cut and remove pie or cake from cookware without damaging the TEFLON or nonstick coating on the cookware.

The apparatus of this invention is compact, unobtrusive, efficient, durable, rugged, is easily constructed, and is inexpensive and economical to manufacture.

Traditional and/or nontraditional manufacturing apparatus and procedures may be used to manufacture the current invention without necessarily requiring significant alteration thereto to accomplish the purposes taught herein.

Once manufactured, the apparatus of the current invention can be easily transported and stored using a minimum amount of space. Consequently, the invention minimizes the packaging size and cargo space required to contain and ship the apparatus. This in turn, reduces transportation and storage costs.

The current invention has a special benefit of incorporating therein a wide variety of different kitchen utensil tools that significantly broaden the scope and versatility of the apparatus. For example, the apparatus of the current invention can be used as tweezers, a knife, an icing spatula, or a serving spatula. Furthermore, a wide variety of other accessories and attachments may be incorporated into the apparatus as discussed herein, and may be designed to match or complement nearly any kitchen implement manufacturer's existing product line.

I claim:

1. An apparatus for removing skin, membrane, bone, cartilage, antennae, legs, shell, beard or vein from seafood prior to, during, or after the seafood is cooked, said apparatus comprising the combination of:
   (a) measuring means for locating the bones within the seafood;
   (b) cutting means for separating the skin, membrane, bones, cartilage, antennae, legs, shell, beard or vein from the seafood, said cutting means being secured to or formed integrally with said measuring means; and
   (c) pinching means for gripping and removing the skin, membrane, bone, cartilage, antennae, legs, shell, beard or vein from the seafood, said pinching means being secured to or formed integrally with said measuring means or with said cutting means.

2. The apparatus of claim 1, wherein said measuring means comprises a gauge, said gauge defining a predetermined angle between at least two different rows or areas of the bones within the seafood.

3. The apparatus of claim 2, wherein said gauge defines said predetermined angle of between forty degrees and one-hundred-and-twenty degrees.

4. The apparatus of claim 2, wherein said gauge defines said predetermined angle of between two-hundred-and-forty degrees and three-hundred-and-twenty degrees.

5. The apparatus of claim 2, wherein said predetermined angle is defined by an angle generally located between said pinching means and said cutting means.

6. The apparatus of claim 5, wherein said pinching means defines a first elongated member having a first axis, said cutting means defining a second elongated member having a second axis, said predetermined angle being defined by an angle generally located between said first axis and said second axis.

7. The apparatus of claim 2, wherein said pinching means comprises a pair of elongated members that generally form a pair of operable tweezers, pincers or pliers.

8. The apparatus of claim 7, wherein said pinching means comprises at least a first pair of elongated tweezers, pincers or pliers and a second pair of elongated tweezers pincers or pliers.

9. The apparatus of claim 8, wherein said predetermined angle is defined by an angle generally located between said first pair of elongated tweezers pincers or pliers and said second pair of elongated tweezers, pincers or pliers.

10. The apparatus of claim 9, wherein said first pair of elongated tweezers, pincers or pliers has a first axis and said second pair of elongated tweezers, pincers or pliers has a second axis, said predetermined angle being defined by an angle generally located between said first axis of said first pair of elongated tweezers, pincers or pliers and said second axis of said second pair of elongated tweezers, pincers or pliers.

11. The apparatus of claim 1, wherein said cutting means is generally oriented within a first plane and said pinching means is generally oriented within a second plane, said first plane being generally parallel to or coplanar with said second plane.

12. The apparatus of claim 1, wherein said cutting means is generally oriented within a first plane and said pinching means is generally oriented within a second plane, said first plane being generally tangential, orthogonal or perpendicular to said second plane.

13. The apparatus of claim 1, wherein said cutting means is generally blunt and unable to cut a finger or a hand of a user.

14. The apparatus of claim 13, wherein said cutting means has at least a first cutting edge.

15. The apparatus of claim 13, wherein said cutting means has at least a first cutting edge and an opposed second cutting edge.

16. The apparatus of claim 13, wherein said measuring means, said cutting means, and said pinching means are integral or unitary in structure.

17. The apparatus of claim 16, wherein said measuring means, said cutting means, and said pinching means, are manufactured from metal, plastic, or a composite material.

18. The apparatus of claim 17, wherein said measuring means, said cutting means, and said pinching means are manufactured using an injection molded process or a vacuum molded process.

19. The apparatus of claim 1, further comprising handle means for holding and manipulating said measuring means, said cutting means, or said pinching means during use of said apparatus, said handle means being operatively secured to or formed integrally with said measuring means, said cutting means, or said pinching means.

20. The apparatus of claim 19, further comprising gripping means for enhancing ability a user to securely grip said handle means during use of said apparatus, said gripping means being operatively secured to or formed integrally with said handle means.

21. The apparatus of claim 19, further comprising means for selectively removing said cutting means from said measuring means, from said pinching means, or from said handle means for easy cleaning of said cutting means.

22. The apparatus of claim 1, wherein said cutting means has a hole or aperture therein.

23. A method for removing skin, membrane, bone, cartilage, antennae, legs, shell, beard or vein from seafood prior to, during, or after the seafood is cooked, said method comprising the steps of:
   (a) placing an apparatus having measuring means for locating the bones within the seafood adjacent to the seafood to locate the bones within the seafood;
   (b) using cutting means for separating the skin, membrane, bone, cartilage, antennae, legs, shell, beard or vein from the seafood to separate the skin, membrane, bone, cartilage, antennae, legs, shell, beard or vein from the seafood; and
   (c) using pinching means for gripping and removing the skin, membrane, bone, cartilage, antennae, legs, shell, beard or vein from the seafood to grip and remove the skin, membrane, bone, cartilage, antennae, legs, shell, beard or vein from the seafood.

* * * * *